(12) United States Patent
Cai et al.

(10) Patent No.: US 9,232,364 B2
(45) Date of Patent: Jan. 5, 2016

(54) METHOD, APPARATUS AND COMPUTER-READABLE MEDIUM FOR IMPROVING PUSH-TO-TALK CALL SETUP SPEED

(75) Inventors: Zheng Cai, Fairfax, VA (US); Feng Huang, Herndon, VA (US); Rajesh Gangadhar, Ashburn, VA (US)

(73) Assignee: Nextel Communications, Inc., Reston, VA (US)

( * ) Notice: Subject to any disclaimer, the term of this patent is extended or adjusted under 35 U.S.C. 154(b) by 1672 days.

(21) Appl. No.: 12/467,393

(22) Filed: May 18, 2009

(65) Prior Publication Data

US 2015/0334539 A1  Nov. 19, 2015

(51) Int. Cl.
| | |
|---|---|
| H04W 4/10 | (2009.01) |
| H04W 76/00 | (2009.01) |
| H04W 60/06 | (2009.01) |
| H04W 88/08 | (2009.01) |

(52) U.S. Cl.
CPC .............. *H04W 4/10* (2013.01); *H04W 60/06* (2013.01); *H04W 76/005* (2013.01); *H04W 88/08* (2013.01)

(58) Field of Classification Search
USPC ................................. 455/450–453, 574, 90.2
See application file for complete search history.

(56) References Cited

U.S. PATENT DOCUMENTS

| | | |
|---|---|---|
| 2003/0012149 A1 | 1/2003 | Maggenti et al. |
| 2005/0141541 A1* | 6/2005 | Cuny et al. ..................... 370/437 |
| 2007/0010275 A1 | 1/2007 | Kiss |
| 2007/0201436 A1 | 8/2007 | Kim et al. |
| 2008/0020808 A1* | 1/2008 | Wang et al. .................... 455/574 |
| 2008/0096614 A1* | 4/2008 | Venkatachalam ............. 455/574 |
| 2008/0107047 A1 | 5/2008 | Olfat |

OTHER PUBLICATIONS

"Power Saving Mechanisms of IEEE 802.11e: Sleep Mode vs. Idle Mode" by Kim et al., Nov. 2006.*
Written Opinion and International Search Report for PCT/US2010/033102 dated Jul. 6, 2010.

* cited by examiner

*Primary Examiner* — Daniel Lai

(57) ABSTRACT

A method, apparatus and computer-readable medium for improving push-to-talk call setup speed by disabling an idle mode of a mobile station are provided. According to the method, a deregistration request is received from a mobile station. The base station determines whether a push-to-talk service flow exists for the mobile station, based upon a unique identifier for push-to-talk service flow for the mobile station. If the service flow does exist, then the base station transmits a deregistration command to the mobile station including an action code that instructs the mobile station to disable its idle mode and change its mobility feature supported field to sleep only mode. Since the time required to transition from sleep mode to active mode is less than from idle mode to sleep mode, the push-to-talk call setup speed is improved.

18 Claims, 4 Drawing Sheets

METHOD, APPARATUS AND COMPUTER-READABLE MEDIUM FOR IMPROVING PUSH-TO-TALK CALL SETUP SPEED

BACKGROUND OF THE INVENTION

Wireless communication networks typically provide a number of different services, such as voice and data communication services. Most wireless communication networks typically offer a single type of voice communication service, interconnect voice communication services (also referred to as circuit-switched voice communication services). Interconnect voice communication services provide a full-duplex communication between two communication endpoints.

Another type of voice communication service is push-to-talk voice communication service (also referred to as dispatch communication service), which involves a half-duplex communication between two communication endpoints. Thus, a push-to-talk call requires flow control to ensure that only one endpoint has permission to talk at any particular time during the call. There are three basic types of push-to-talk calls, call alerts, private calls and group calls. Call alerts merely inform the caller whether the called party is available for a call, but no voice channel is established. Private calls involve establishing a voice channel between two endpoints, whereas group calls involve establishing a voice channel between more than two endpoints.

Push-to-talk communication services have historically been employed in private wireless communication networks by, for example, taxi cab companies or emergency service agencies (e.g., police and fire departments). Until recently, the only type of public wireless communication network that supported push-to-talk calls was the iDEN network, such as the one owned and operated by Sprint Nextel Corporation.

One of the most recognized advantages of push-to-talk calls compared to interconnect calls is the fast call setup time. For example, push-to-talk calls are typically setup in less than one second, whereas interconnect calls may not even begin to ring the called party in this time. Private wireless communication networks and the iDEN network are able to provide push-to-talk calls with a fast setup time because these networks are specifically designed to provide these types of calls.

SUMMARY OF THE INVENTION

The present invention provides a solution to the above-mentioned problems of the prior art by providing a method, apparatus and computer-readable medium for improving call setup times for push-to-talk calls by disabling the idle mode of a mobile station in a push-to-talk call.

In today's 4G wireless technology (e.g., WiMAX), radio air interface spectrum efficiency has improved significantly due to advances in the technology. One of the factors that improves the system efficiency is that when no activity is going on for a mobile device, it will deregister from the system and enter an idle mode. Accordingly, the system will release resources that store the majority of information on this device.

In order for the target device to transition from idle mode back to active mode, first, the device has to be paged. Then it has to wake up and go through a network re-entry process, which will take a second or more depending upon the specific implementation. The length of time required for such a transition back to the active mode is unacceptably long for real time applications such as push-to-talk calling.

The method according to the present invention identifies a specific push-to-talk service flow when a mobile device deregisters from the system. In a deregistration command (DREG-CMD), a current action code in a standard format (e.g., WiMAX) may be used to notify the mobile device to stay in the normal operation mode and disable its idle mode capability, so that the mobile device will only transition to sleep mode instead of idle mode. This will significantly improve the push-to-talk call setup time of the mobile device.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
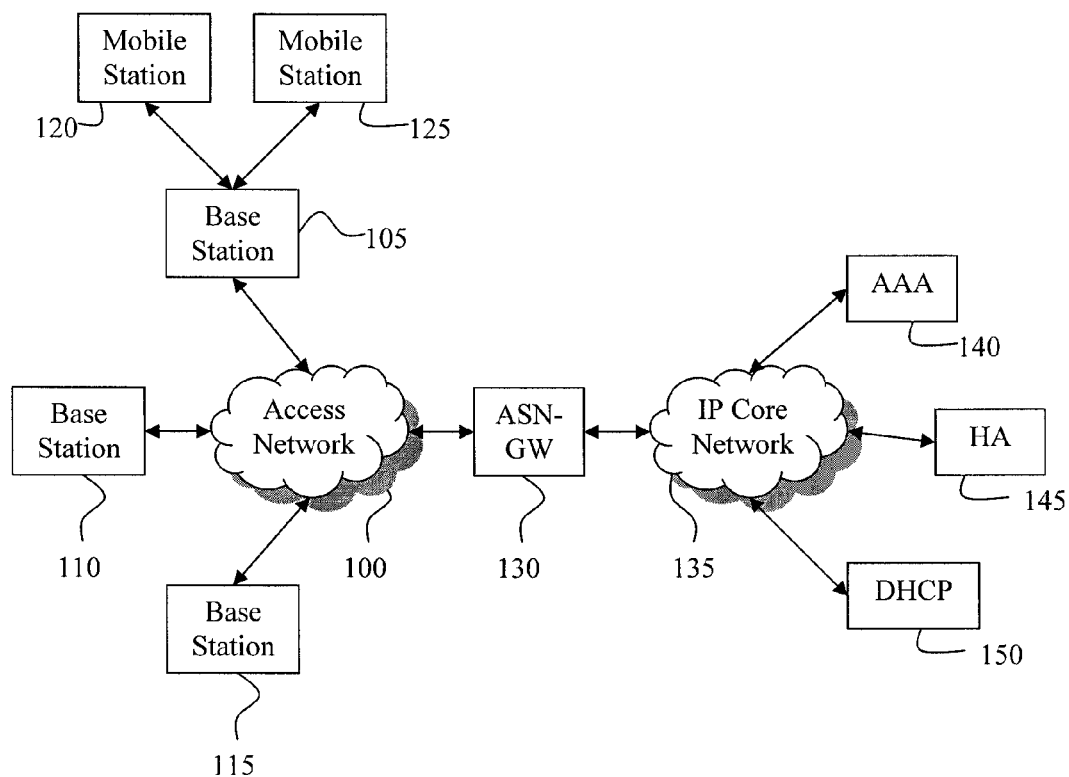
FIG. 1 illustrates an exemplary embodiment of a system in accordance with the present invention.

FIG. 1 illustrates an exemplary embodiment of a system in accordance with the present invention. A WiMAX network is illustrated in FIG. 1, but the invention is not limited to WiMAX networks. The system includes an Access Network 100, Access Service Network Gateway (ASN-GW) 130, and an IP Core Network 135. Base Stations 105, 110, and 115 communicate with the ASN-GW 130 via the Access Network 100. Mobile Stations 120 and 125 communicate with the Access Network 100 via an air interface through the Base Station 105. Although FIG. 1 only illustrates two mobile stations, a plurality of mobile stations could be connected to any of the base stations, and the number of base stations can be increased or decreased.

The Access Service Network Gateway (ASN-GW) 130 connects the Access Network 100 to the IP Core Network 135 and acts as a traffic aggregation point within the network. Connected to the IP Core Network 135 are an Authentication, Authorization and Accounting (AAA) Server 140, a Home Agent (HA) 145, and a Dynamic Host Control Protocol (DHCP) server 150. The AAA server 140 supports authentication for the mobile stations, users and services. The home agent (HA) 145 determines a home network for a user and registers the user in the HA 145. The dynamic host configuration protocol (DHCP) server 150 may be used to provide centralized management of the IP addresses which are used on the IP Core Network 135.

The present invention improves push-to-talk call setup by disabling the idle mode of the mobile station via a deregistration command sent to the mobile station by the base station. The push-to-talk service flow is identified by setting a unique identifier, such as a unique port number and/or a mobile station IP address for push-to-talk service flow in the quality of service (QoS) classifier. When the base station receives a deregistration request message from the mobile station, the base station checks all of the service flows that have been created for the mobile station by matching the unique identifier to determine whether a push-to-talk service flow exists.

If a push-to-talk service flow exists for the mobile station, the base station will respond with a deregistration command (e.g., DREG-CMD) which includes an action code that instructs the mobile station to stay in the normal operation mode. In other words, the mobile station is instructed to disable its idle mode, so that the mobile station will not request deregistration again when its idle timer expires.

Currently, in the WiMAX standard there is no such action code. There is an action code that tells the mobile station to stay in normal operation mode, but when its idle timer expires, the mobile station will request deregistration again. Since there are eight reserved action codes that are not used in the standard, one of the reserved action codes could be used to instruct the mobile station to disable the idle mode.

Figure 2:
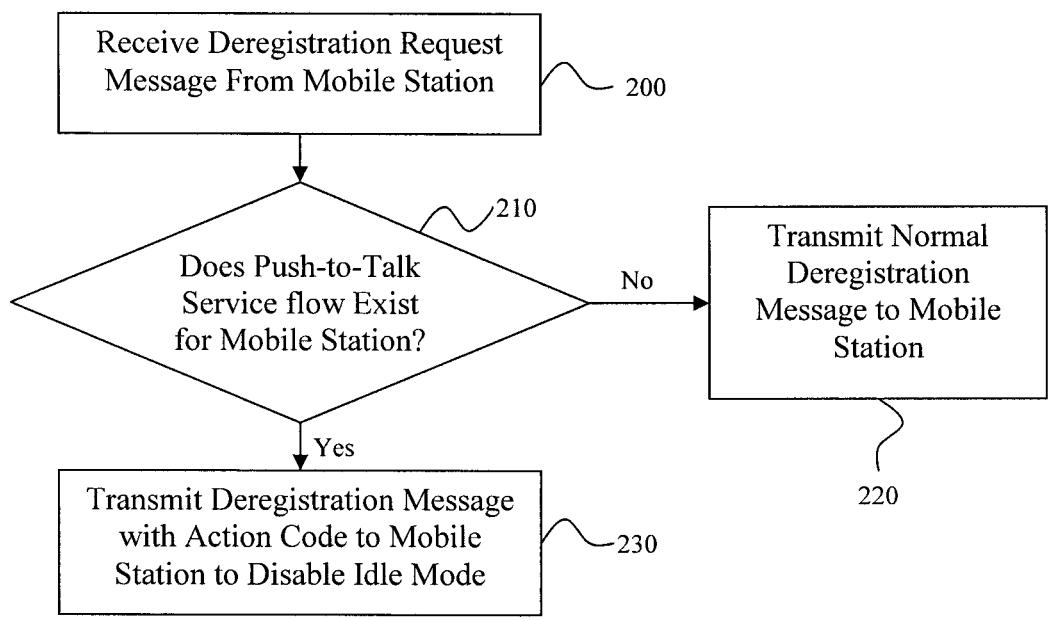
FIG. 2 illustrates an exemplary embodiment of a method for improving call setup times for push-to-talk calling in accordance with the present invention.

FIG. 2 illustrates an exemplary embodiment of a method for improving call setup times for push-to-talk calling, in accordance with the present invention. In step 200, a deregistration request message is received in a base station from an originating mobile station. In step 210, it is determined whether a push-to-talk service flow exists for the mobile station by the base station matching the unique identifier against all service flows created for the mobile station. If the push-to-talk service flow does exist, then in step 230 a deregistration command message with an action code to disable the idle mode of the mobile station is sent from the base station to the mobile station. If the push-to-talk service flow does not exist for the mobile station, then in step 220 a deregistration command message without the action code is transmitted to the mobile station.

Figure 3:
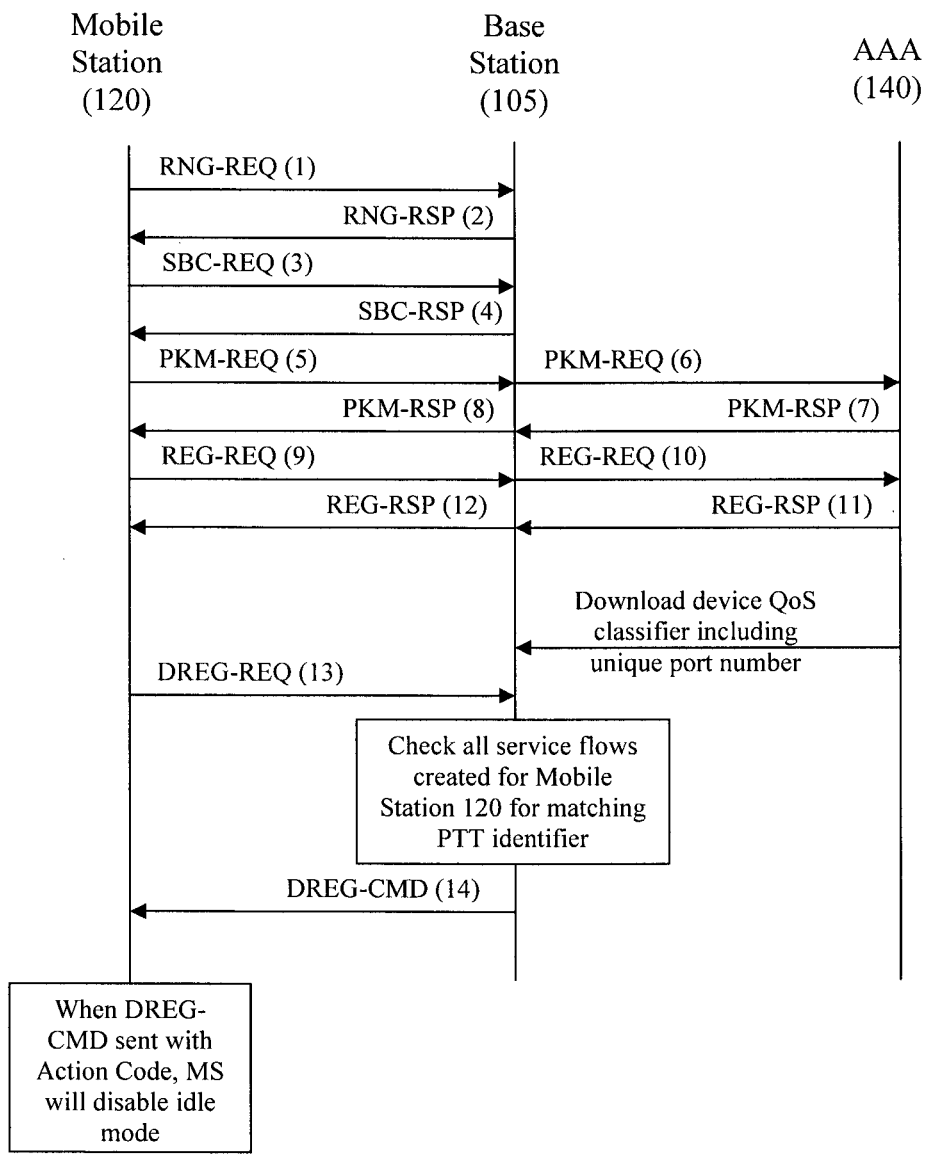
FIG. 3 illustrates an exemplary embodiment of a service flow in accordance with the present invention.

FIG. 3 illustrates an exemplary embodiment of a service flow in accordance with the present invention. In step 1, a mobile station 120 transmits a Ranging Request (RNG-REQ) message to a base station 105, which responds in step 2 with a Ranging Response (RNG-RSP) message to establish the timing offset and power for the mobile station 120. Then, in step 3, the mobile station 120 transmits a Subscriber Station Basic Capability Request (SBC-REQ) message to the base station 105, which responds with a Subscriber Station Basic Capability Response (SBC-RSP) message in step 4. The mobile station 120 transmits a Privacy Key Management Request (PKM-REQ) message to the base station (step 5) for authentication and key exchange for the mobile station 120. The authentication is performed in step 6 via the AAA server 140. A Privacy Key Management Response (PKM-RSP) message is transmitted from the AAA server 140 to the base station 105 in step 7, and then to the mobile station 120 in step 8.

In step 9, the mobile station 120 transmits a Registration Request (REG-REQ) message to the base station 105, which registers the mobile station 120 in the AAA server 140 in step 10. The AAA server 140 responds with a Registration Response (REG-RSP) message in step 11, and the base station 105 transmits the registration information to the mobile station 120 in step 12. After step 12, all provisioned service flows together with associated QoS classifier with unique port number for each service flow will be created and made available at the base station 105. When a Deregistration Request (DREG-REQ) message is transmitted from the mobile station 120 to the base station 105 in step 13, all service flows created for the mobile station 120 are checked for the unique push-to-talk identifier. The base station 105 responds to the DREG-REQ by transmitting a Deregistration Command (DREG-CMD) in step 14. This command may include an action code to disable the idle mode of the mobile station 120. If the action code is used, communications with the mobile station 120 can occur more quickly, because the mobile station 120 will not need any time to recover from its idle mode.

Figure 4:
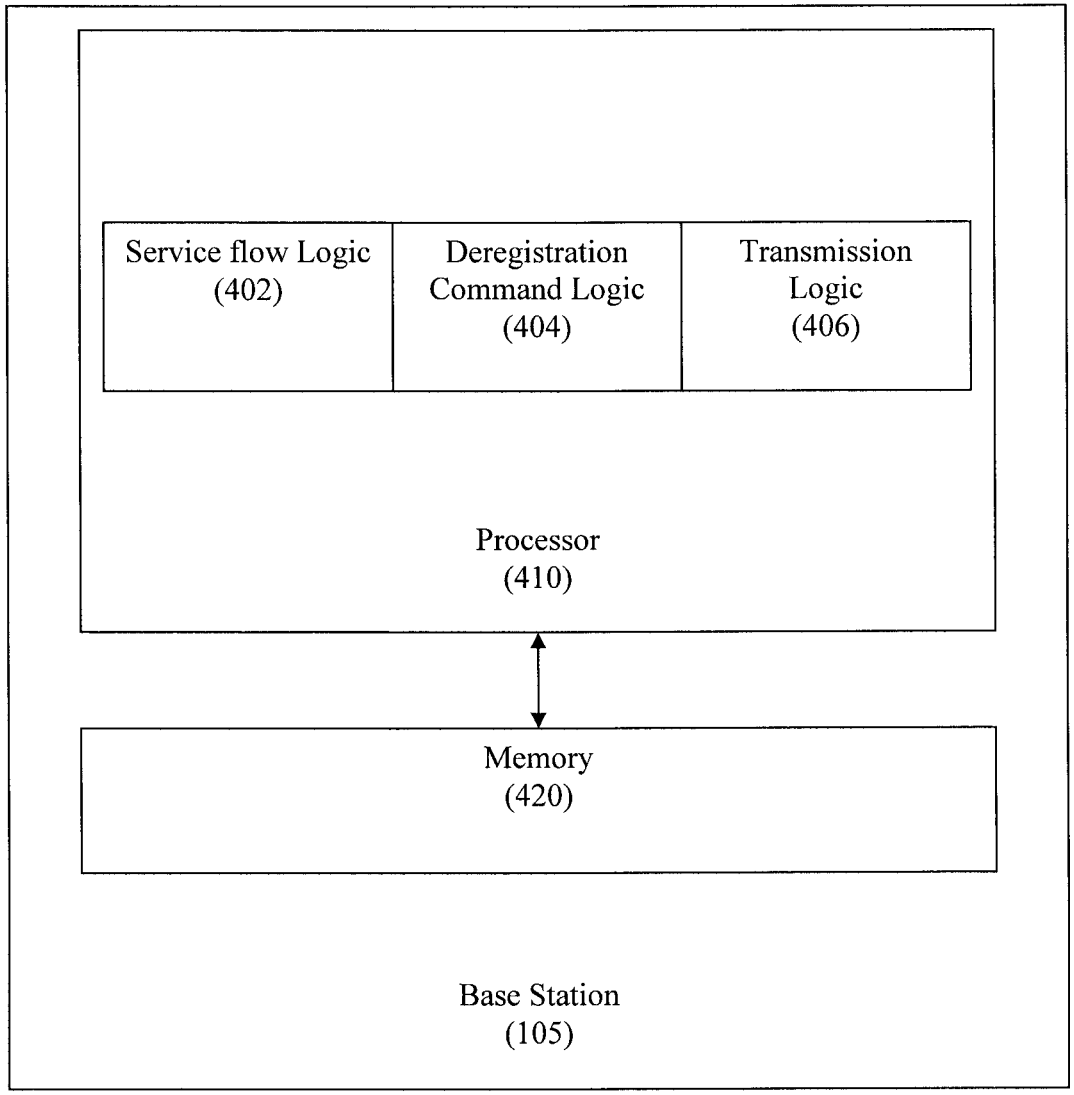
FIG. 4 illustrates a schematic representation of an exemplary embodiment of a push-to-talk base station in accordance with the present invention.

FIG. 4 illustrates a schematic representation of an exemplary embodiment of a push-to-talk base station in accordance with the present invention. The base station 105 illustrated in FIG. 4 includes a processor 410 coupled to a memory 420. Processor 410 includes logic 402, 404 and 406. Processor 410 can be any type of processor, such as a field programmable gate array (FPGA), application specific integrated circuit (ASIC) and/or a microprocessor. When processor 410 is a microprocessor, logic 402-406 can be computer readable code executed by the microprocessor, and loaded from a computer readable medium such as memory 420. Memory 420 can be any type of memory including random access memory (RAM), read-only memory (ROM), flash memory, a hard disk, a CD, and/or a DVD.

Logic 402 determines whether a push-to-talk service flow exists for an originating mobile station by matching the push-to-talk identifier for the mobile station. When it is determined that the push-to-talk service flow exists, logic 404 assembles a deregistration command that includes an action code for instructing the originating mobile station to disable its idle mode. When the push-to-talk service flow does not exist, logic 404 assembles the deregistration command without the action code. The deregistration command is sent to the originating mobile station by transmission logic 406.

In another exemplary embodiment of the present invention, there is a computer-readable medium encoded with a computer program for improving call setup times for push-to-talk calling. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

An exemplary embodiment of a computer-readable medium encoded with a computer program for improving call setup times for push-to-talk calling is illustrated in FIG. 2, which is described above.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for improving push-to-talk call setup speed, the method comprising acts of:
 receiving, by a base station, a deregistration request message from a mobile station;
 determining whether a push-to-talk service flow exists for the mobile station, based upon a unique identifier for the push-to-talk service flow for the mobile station; and
 when the push-to-talk service flow exists for the mobile station, transmitting a deregistration command that includes an action code for instructing the mobile station to disable an idle mode of the mobile station.

2. The method of claim 1, wherein, when it is determined that the push-to-talk service flow does not exist for the mobile station, the deregistration command does not include the action code for instructing the mobile station to disable the idle mode of the mobile station.

3. The method of claim 1, wherein, when the idle mode is disabled, expiration of an idle timer is ignored by the mobile station.

4. The method of claim 1, further comprising an act of:
 setting the unique identifier for the push-to-talk service flow in a quality of service (QoS) classifier.

5. The method of claim 1, wherein, when the idle mode is disabled, the mobile station enters a sleep mode upon expiration of an idle timer.

6. The method of claim 1, wherein the base station and the mobile station operate using WiMAX technology.

7. The method of claim 1, wherein the unique identifier comprises at least one of a particular push-to-talk port number and a mobile station IP address.

8. A base station, comprising:
 a memory; and
 a processor coupled to the memory, wherein the base station receives a deregistration request from a mobile station, and wherein the processor includes
  logic that determines whether a push-to-talk service flow exists for the mobile station, based upon a unique identifier for the push-to-talk service flow for the mobile station; and
  logic that assembles a deregistration command for the mobile station, based upon whether the service flow exists for the mobile station,
 wherein, when the push-to-talk service flow exists for the mobile station, the deregistration command includes an action code that instructs the mobile station to disable an idle mode of the mobile station.

9. The base station of claim 8, wherein the processor further comprises:
 logic that sends the deregistration command to the mobile station.

10. The base station of claim 8, wherein the base station and the mobile station operate using WiMAX technology.

11. The base station of claim 8, wherein the unique identifier comprises at least one of a particular push-to-talk port number and a mobile station IP address.

12. A non-transitory computer-readable medium encoded with a computer program for improving push-to-talk call setup speed by disabling an idle mode of a mobile station, the computer program comprising instructions for:
 receiving, in a base station, a deregistration request message from the mobile station;
 determining whether a push-to-talk service flow exists for the mobile station, based upon a unique identifier for the push-to-talk service flow for the mobile station; and
 when the push-to-talk service flow exists for the mobile station, transmitting a deregistration command that includes an action code for instructing the mobile station to disable the idle mode of the mobile station.

13. The non-transitory computer-readable medium of claim 12, wherein, when the push-to-talk service flow does not exist for the mobile station, the deregistration command does not include the action code for instructing the mobile station to disable the idle mode of the mobile station.

14. The non-transitory computer-readable medium of claim 12, wherein, when the idle mode is disabled, expiration of an idle timer is ignored by the mobile station.

15. The non-transitory computer-readable medium of claim 12, further comprising instructions for:
 setting the unique identifier for the push-to-talk service flow in a quality of service (QoS) classifier.

16. The non-transitory computer-readable medium of claim 12, wherein, when the idle mode is disabled, the mobile station enters a sleep mode upon expiration of an idle timer.

17. The non-transitory computer-readable medium of claim 12, wherein the base station and the mobile station operate using WiMAX technology.

18. The non-transitory computer-readable medium of claim 12, wherein the unique identifier comprises at least one of a particular push-to-talk port number and a mobile station IP address.

* * * * *